United States Patent [19]
Bamberg et al.

[11] 3,947,119
[45] Mar. 30, 1976

[54] ACTIVE SENSOR AUTOMATIC RANGE SWEEP TECHNIQUE

[75] Inventors: Jack A. Bamberg; Hans R. Bucher; John G. Bultena, all of Boulder, Colo.

[73] Assignee: Ball Brothers Research Corporation, Boulder, Colo.

[22] Filed: Feb. 4, 1974

[21] Appl. No.: 439,175

[52] U.S. Cl............. 356/5; 350/276 R; 178/DIG. 1
[51] Int. Cl.².................... G01C 3/08; G02B 27/00
[58] Field of Search............ 356/4, 5; 343/5 SM, 13, 343/7.3; 178/DIG. 1, 7.2; 350/276 R

[56] References Cited
UNITED STATES PATENTS

| | | | |
|---|---|---|---|
| 3,430,235 | 2/1969 | Bender et al.................... | 343/5 R |
| 3,682,553 | 8/1972 | Kapany........................... | 356/5 |
| 3,723,002 | 3/1973 | Everest et al.................. | 343/7.3 |
| 3,743,418 | 7/1973 | Heflinger....................... | 356/4 |
| 3,751,166 | 8/1973 | Starkey et al.................. | 356/5 |
| 3,752,581 | 8/1973 | Everest et al.................. | 356/5 |
| 3,810,178 | 5/1974 | Basard et al.................. | 343/5 SM |

*Primary Examiner*—Richard A. Farley
*Assistant Examiner*—S. C. Buczinski
*Attorney, Agent, or Firm*—James D. Haynes

[57] ABSTRACT

A plurality of range increments are sequentially pulse-illuminated and energy reflected therefrom is received by a gated light amplifier. Timing circuitry sequentially varies the range viewed, by adjusting the time between illumination and gating on of the light amplifier to achieve enhancement, suppression or apparent uniform illumination of preselected range increments such that all ranges of interest are viewed by the light amplifier within a single integration period of a recording device.

8 Claims, 4 Drawing Figures

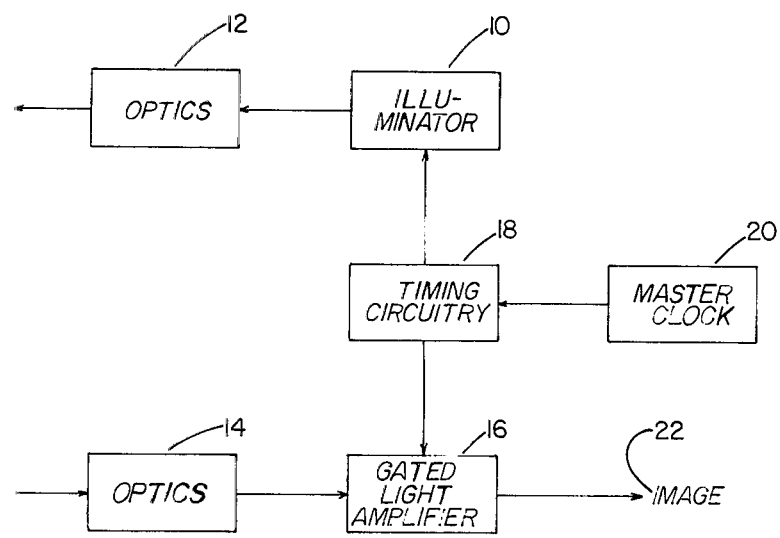
FIGURE 1
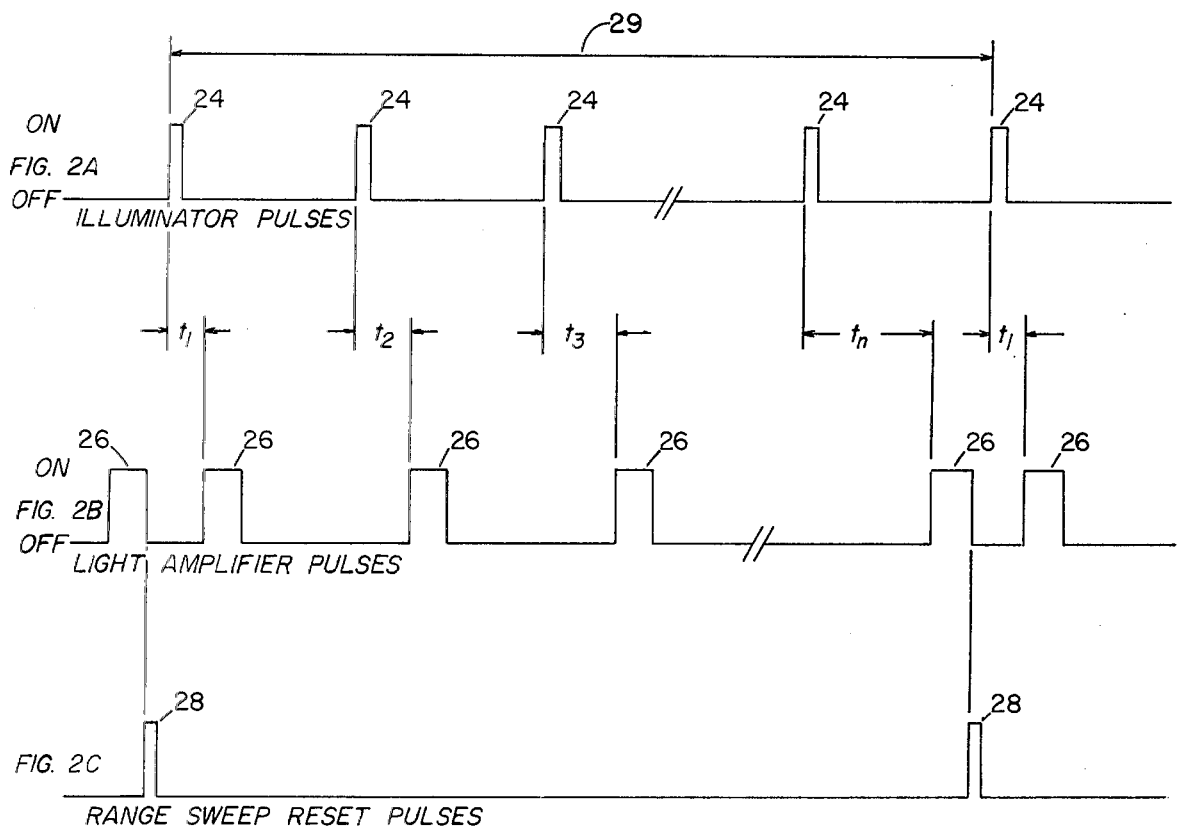

the illuminator pulse and the light amplifier pulse permits an entire depth of range to be scanned during a single integration time of a recording device. Pulsing of the light amplifier occurs at a slightly different time (range) for each successive illuminator pulse such that all ranges of interest may be illuminated within a single integration time of a recording device, e.g., the reaction time of an eye, the exposure time of a frame of film, etc. Thus, the image displayed by the light amplifier appears continuous for all ranges. If the image is being viewed with an eye, the repetition rate at which all ranges are scanned will need to be high enough to prevent the eye from detecting any flicker.

The spatial energy pulses are distributed over the ranges of interest without gaps in such a manner that the returning energy received by the light amplifier is constant for all ranges. More spatial energy pulses are placed at longer ranges and fewer spatial energy pulses are placed at shorter ranges to exactly compensate for the decrease in energy density at longer ranges due to atmospheric scattering and attenuation over the path length and the spread in the illuminator beam.

Selected ranges within the depth of field may be examined in greater detail by increasing the number of spatial energy pulses distributed at that particular range. Also, certain ranges may be suppressed by causing no spatial energy pulses to be distributed at that particular range. A spatial energy pulse is in essence the depth of range from which a single pulse of light is reflected and received by optical means. The time lag between pulsing of the illuminator and the pulsing of the light amplifier (optical receiving means) and the duration of the illuminating pulse and the image intensifier pulse defines the spatial energy pulse.

This technique permits all targets between an adjustable minimum and maximum range to be illuminated and viewed by a recording device. Image deterioration due to atmospheric backscatter is not serious, due to the described energy distribution technique. Backscatter is more severe at close ranges, but little energy is sensed from there. Similarly, backscatter is little problem at long ranges where many spatial energy pulses are distributed. Since the decrease in energy density has been compensated for by the appropriate distribution of spatial energy pulses, an output image is provided which appears to be uniformly illuminated as in daylight.

DESCRIPTION OF THE DRAWINGS

Other objects, features and advantages of the present invention will be more apparent after referring to the following specification and accompanying drawings in which:

FIG. 1 is a system block diagram of a preferred embodiment of the present invention;

FIG. 2 is a timing diagram showing the time relationship of various pulses employed during operation of the systems of FIG. 1;

DESCRIPTION OF THE PREFERRED EMBODIMENT

Figure 3:
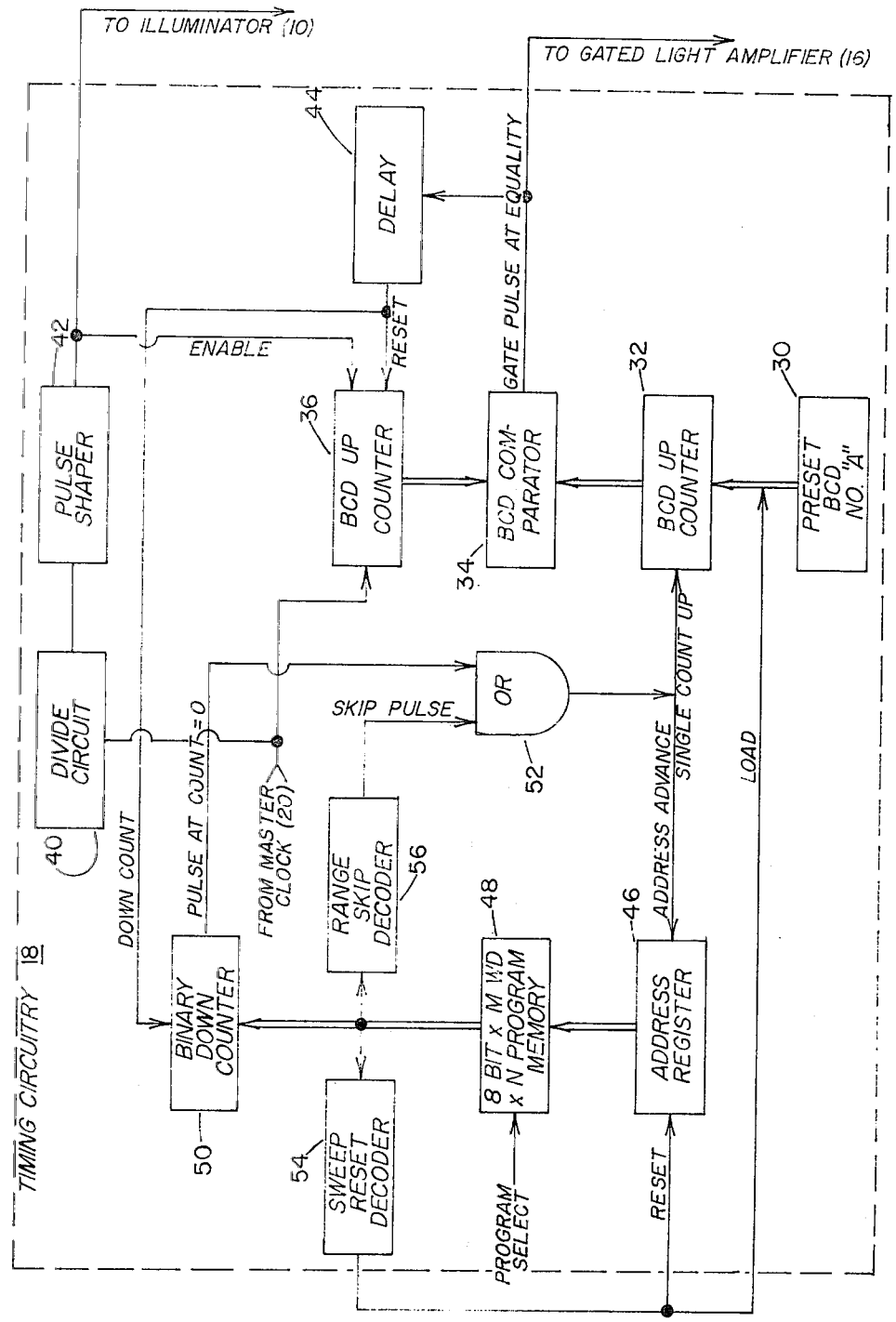
FIG. 3 is a diagrammatic view of one embodiment of the timing circuitry of the present invention.

Referring to FIG. 1, repetitively pulsed light illuminator 10 and optical system 12 illuminate a scene of interest. Optical system 14 has the same field-of-view as optical system 12 to thus view the same scene of interest as optical system 12 and relay an image to gated light amplifier 16. The image (energy) received by optical system 14 passes to light amplifier 16 and is present as an image to a recording device such as photographic film or an observer's eye. Timing circuitry 18 is paced by master clock 20 and provides synchronization pulses to both the illuminator 10 and to the gated light amplifier 16. The amount of time delay between the illuminator pulse and the intensifier pulse determines the range to be observed at the output of light amplifier 16, due to the finite speed of light making a round trip from the illuminator 10 to light amplifier 16. The timing circuitry 18 provides automatic adjustment of the time delay for each pulse pair so that an integrated image results, so long as all ranges are viewed within one integration time of the output recording device.

FIG. 2 represents an exemplary timing diagram of the present invention. Illuminator pulses 24 are disclosed in FIG. 2A, light amplifier gate pulses 26 are disclosed in FIG. 2B and range sweep reset pulses 28 are disclosed in FIG. 2C. Illuminator 10 (FIG. 1) is pulsed on by pulse 24 only when light amplifier 16 is gated off. Light amplifier 16 is gated on a time $T_1$ later than illuminator 10 by pulse 26 to receive returning energy from targets within the corresponding range interval (determined by the time delay). The time $T_1$ is the time it takes for light from illuminator 10 to travel to a discrete range and the energy reflected therefrom to be received by light amplifier 16. Time $T_1$ is altered by timing circuitry 18 for each pulse pair such that the successive time delays are $T_2, T_3 \ldots T_n$. The illuminator pulse repetition rate 29 is chosen so that the maximum time delay can be accomodated between two adjacent illuminator pulses. These time values may be selected in any manner such that desired ranges are viewed or such that certain range increments are pulsed more than once to provide range enhancement of that particular range or such that certain range increments are pulsed less or not at all to provide for range suppression of that particular range. As previously noted, it may also be necessary to pulse greater ranges more times than nearer ranges to compensate for the decrease in energy density at longer ranges due to atmospheric scattering and attenuation over the path length and the spread in the illuminator beam.

One embodiment of timing circuitry 18 is shown in greater detail in FIG. 3. Other circuit variation may be designed to accomplish the functions of timing circuitry 18. The placement of spatial energy pulses is quantized at integer multiples of a range increment $\Delta R$ which is determined by the frequency of master clock 20. The frequency of master clock 20 is determined by the range accuracy desired for the system using the formula:

$$f = \frac{c}{2\Delta R}$$

where $f$ is the frequency, $c$ is the velocity of light, and $\Delta R$ is the range accuracy or range increment desired. The number of range increments equivalent to the minimum illuminated range is stored as BCD number A in register 30. Memory 48 stores binary numbers which represent the number of times it is desired to pulse at each range, starting at the minimum range (BCD num-

ACTIVE SENSOR AUTOMATIC RANGE SWEEP TECHNIQUE

BACKGROUND OF THE INVENTION

The present invention relates to electro optics and more particularly to the method and apparatus for simultaneously displaying targets at different ranges. The ability to view objects at ranges of several miles and under conditions of substantial total darkness has presented many difficulties in the past. Numerous devices have evolved which detect targets under such conditions. It can be readily appreciated that in nighttime surveillance of a battlefield area, it is highly desirable to minimize the possibility of detection of the illuminating device and yet provide a display which is the same as could be obtained during normal daylight hours. Accordingly, many devices utilize an illuminant operable in the non-visible range of the electromagnetic energy spectrum such as infrared of ultraviolet. Since a laser offers a narrow spectral band of infrared radiation and spectral discrimination, i.e., it increases the reflectivity of many materials, there are devices which use a pulsed laser to illuminate the desired area of view. There are range finders which use lasers to effectively search for targets at preselected ranges. In these active-gated laser systems, the range gate interval is successively lengthened upon each successive transmittal of a laser pulse until an echo response is detected whereupon the automatic range sweeping operation is halted. Thus, the presence of a target at a particular range is detected.

While some devices relate to visual display of objects at a predetermined distance and others relate to the ascertainment of only distance to a target, still others disclose means for both visually displaying a particular scene and at the same time determining the distance to the objects therein. U.S. Pat. No. 3,495,906 to Firmin and U.S. Pat. No. 3,649,124 to Takaoka disclose such devices. Firmin periodically illuminates a field of view and uses the propagation time of reflected successive pulses to indicate distance to the object. A special form of display tube is used wherein different deflection rates are utilized for successive pulse illuminations of the target area to result in a display wherein objects located at various ranges within the target area are displaced with respect to one another. Takaoka discloses an active-gated television system which displays successive full-frame images of various ranges as a composite. Each range is displayed as a different color in the composite display to distinguish the various ranges that are being observed. In U.S. Pat. No. 3,682,553 to Kapany, successive entire frames are generated for successively different range distances and combined into a composite display to achieve a three-dimensional view of an object within the target area and the television system.

In known devices the range being examined is held constant for a particular integration time. Since a periodically pulsed illuminator is operated in sequence with a periodically gated sensor, the spacing between the illuminator pulse and the gated sensor pulse determines the particular range being observed. The depth of field viewed at a particular range is usually very narrow in order to eliminate atmospheric backscatter. Accordingly, a potential target may be within the field of view and not be detected if the range being examined happens to vary even slightly from the range wherein the potential target is disposed. As the depth of field is increased, the atmospheric backscatter also increases to seriously degrade image quality. Also, the observed interscene brightness of various targets at different ranges varies with the square of the distance to the particular object and with atmospheric conditions through which they are viewed.

There is a need for a low-tight level device that will provide surveillance of a wide range and yet provide uniform displayed target brightness. As opposed to providing a device for viewing a first range and then a second range or a composite formed from the stored range increments, there is a need for a device which continually scans a wide path of ranges to provide a visual image.

Accordingly, it is an object of the present invention to provide a low tight level active device which provides a view of a wide depth of field with minimal image deterioration due to backscatter.

It is a further object of this invention to provide a low light level active device which displays a wide depth of field wherein the image intensities are constant over the depth of field.

It is yet another object of this invention to provide a low light level active device which displays a wide depth of field wherein the image intensities are constant over the depth of field.

It is yet another object of this invention to provide an active-gated device wherein a plurality of ranges are scanned and displayed during a single integration period of a recording device to thereby produce a continuing visual display of an entire wide depth of field.

Another object of this invention is to provide a displayed image under low or adverse ambient viewing conditions which closely simulates that which occurs with natural illumination.

Yet another object of this invention is to provide for target enhancement or suppression at a selected range interval or intervals while simultaneously displaying all other ranges of interest.

A final object of this invention is to provide a device to illuminate a scene with pulsed illumination and observe the same scene with a gated light amplifier in such a manner that the time spacing between illuminator and light amplifier pulse pairs is varied in a systematic manner such that all ranges of interest are viewed by the light amplifier within a single integration period of a recording device.

SUMMARY OF THE INVENTION

The present invention provides an active-gated device for scanning a wide depth of field during each integration time of a recording device to provide a visual output image to said recording device, which could consist of an observer, photographic film, or other electro-optical means. Targets at all ranges are seen simultaneously while the ability to suppress atmospheric backscatter is restained and interscene brightness differences are eliminated.

Illuminator pulses are used to illuminate a particular field of view. The amount of time delay between the illuminator pulse and a pulse which energizes the light amplifier for receiving reflected light determines the range displayed in the output image. The depth of field at this range is determined by means of a mathematical convolution operation of the illuminator and sensor pulses and will be referred to as a "spatial energy pulse." Automatic adjustment of the timing between ber A) and sequentially progressing to the maximum range desired.

Timing circuitry 18 operates in the following manner. At the beginning of a range sweep, range sweep reset pulse 28 from sweep reset decoder 54 loads BCD number "A" from register 30 into BCD up counter 32. Range sweep reset pulse 28 also resets memory address register 46 which loads the data in the first memory location of memory 48 into binary down counter 50. The data in counter 32 represents the desired range and the data in counter 50 represents the number of times this range is to be illuminated with a spatial energy pulse.

The frequency of master clock 20 is divided down to a lower frequency by divide circuit 40 before being fed to pulse shaper 42. The output 24 of pulse shaper 42 drives illuminator 10. The illuminator pulse rate (the period of pulse 24) is chosen to be slow enough to allow for the round trip time of light to the farthest target of interest within one pulse period. Output pulse 24 of pulse shaper 42 also enables BCD up counter 36. BCD up counter 36 counts up at the frequency of master clock 20.

The data in counters 32 and 36 are constantly being compared by BCD comparator 34. When these data become equal, a gate pulse 26 is sent to gated light amplifier 16 which then receives reflected energy from the desired range. This same gate pulse also resets BCD up counter 36 through time delay 44 and also causes binary down counter 50 to down count by one. Thus, the data in counter 50 continually represents the number of times the desired range represented by the data in counter 32 has yet to be used. When the data in counter 50 reaches zero, an output pulse is issued through OR gate 52 which advances memory address register 46 by one, causing the data in the next memory location of memory 48 to be loaded into counter 50. The same output pulse also advances the desired range data in counter 32 by one. At this point the cycle continues, with the new desired range (data in counter 32) being used the desired number of times (data in counter 50). Accordingly, the spatial energy pulse ranges continue to increase in a manner determined by the memory 48 and by BCD number "A" in register 30.

It may be desired that a particular range be skipped. In the event, a specially coded binary number in the corresponding memory location of memory 48 causes range skip decoder 56 to issue a skip pulse to OR gate 52, which directly updates counter 32 and address register 46.

At the end of a range sweep, a second specially coded binary number from memory 48 triggers sweep reset decoder to produce range sweep reset pulse 28 (FIG. 2C) which resets memory address register 46 back to zero and reloads BCD number "A" from register 30 into counter 32. The entire operational cycle set forth hereinabove then repeats to again sweep all range intervals within the integration time of the viewing device.

Using the method and apparatus of the present invention, it is possible to "sweep" in range while effecting the desired range distribution of spatial energy pulses. No flicker will be observed in the output image provided the entire sweep occurs within a single integration time of the output recording device. If the eye is the final recording device, for example, the entire sweep should occur within a time period corresponding to the critical flicker frequency, typically 30 to 45 Hz.

Figure 4:
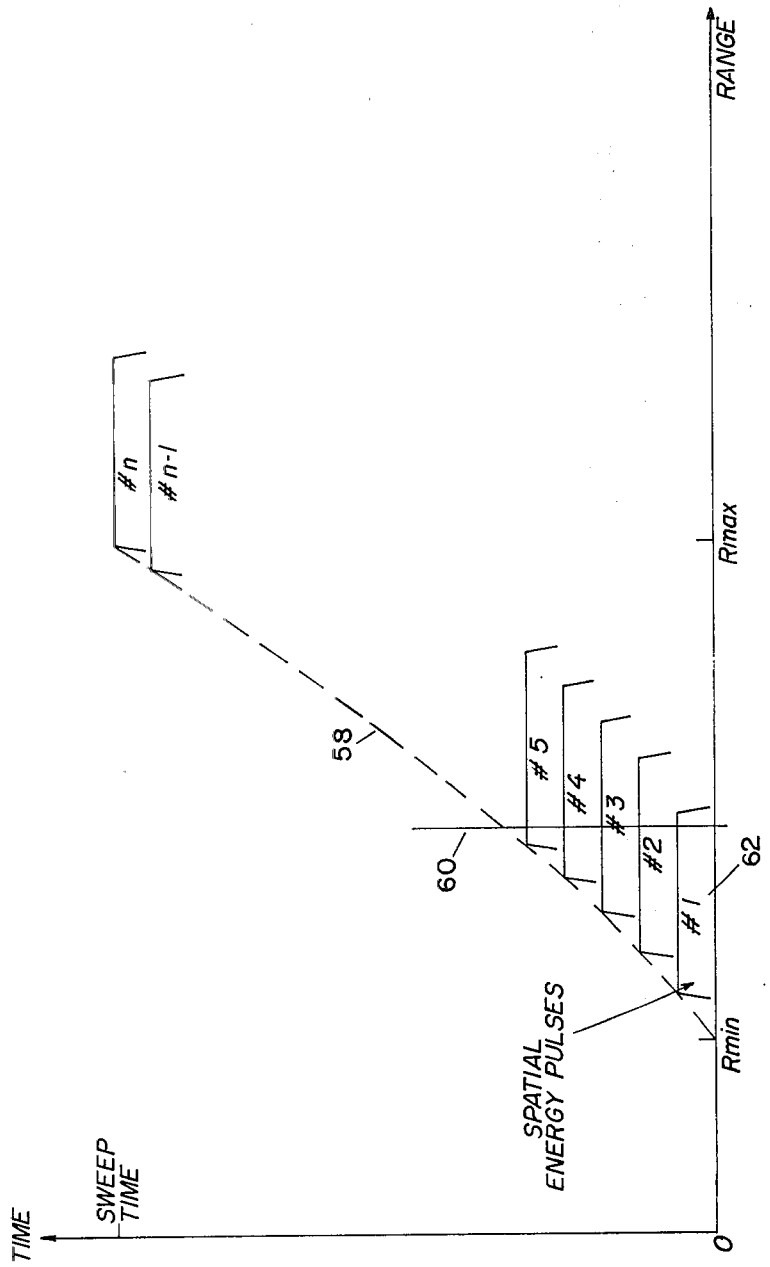
FIG. 4 is a preferred method of spatial energy pulse distribution.

An image may be provided that displays natural illumination of all targets within the ranges being swept. To achieve equal illumination of targets at different ranges, more spatial energy pulses are placed at longer ranges and fewer spatial energy pulses are placed at shorted ranges to exactly compensate for the decrease in energy density at longer ranges due to atmospheric scattering and attenuation over the path length and the spread in the illuminator beam. To achieve equal illumination over an entire depth of range, the spatial energy pulses will be distributed typically as shown in FIG. 4. FIG. 4 discloses an exemplary spatial energy pulse distribution. By properly adjusting the distribution of the spatial energy pulses and thus line 58, all targets will have equal observed intensity. By drawing a vertical line such as line 60, one may see the number of spatial energy pulses 62 which illuminate a particular range. $R_{max}$ receives greater illumination (more spatial energy pulses) than does $R_{min}$. Obviously there are many other techniques to achieve desirable spatial energy distributions. Accordingly, only an exemplary approach has been disclosed herein.

We claim:

1. An electro-optical device comprising; illuminator means for illuminating a scene; timing circuitry for pulsing said illuminator means on and off; optical means comprising a gated light amplifier, said gated light amplifier being gated "on" for a discrete time period after said illuminator means in a systematic manner such that all range increments within said scene are systematically scanned by said light amplifier within a single integration period of a recording device; and a master clock having a frequency determined by the formula:

$$f = \frac{c}{2\Delta R}$$

where $f$ is the frequency, $c$ is the velocity of light, and $\Delta R$ represents the range increments to be systematically scanned in said scene, said timing circuitry being responsive to said master clock, said timing circuitry comprising means for causing a preselected number of illuminator pulses to impinge each said range increment whereby all ranges within the scene viewed by said light amplifier appear to have the same brightness.

2. An electro-optical device comprising: illuminator means for illuminating a scene; timing circuitry for pulsing said illuminator means on and off; optical means comprising a gated light amplifier, said gated light amplifier being gated on for a discrete time period after said illuminator means in a systematic manner such that all range increments within said scene are systematically scanned by said light amplifier within a single integration period of a recording device; and a master clock having a frequency determined by the formula:

$$f = \frac{c}{2\Delta R}$$

where $f$ is the frequency, $c$ is the velocity of light, and $\Delta R$ represents the range increments to be systematically scanned in said scene, said timing circuitry being responsive to said master clock, said timing circuitry comprising means for causing a preselected number of illuminator pulses to impinge each said range increment whereby any preselected ranges within the scene viewed by said light amplifier may have greater brightness than other ranges viewed by said light amplifier.

3. An electro-optical device comprising; illuminator means for illuminating a scene; timing circuitry for pulsing said illuminator means on and off; and optical means comprising a gated light amplifier, said gated light amplifier being gated on for a discrete time period after each pulse of said illuminator means in a systematic manner such that a plurality of range increments are viewed by said light amplifier within a single integration period of a recording device, said timing circuitry comprising means for causing a preselected number of illuminator pulses to impinge each said range increment whereby any preselected ranges within the scene viewed by said light amplifier may have greater brightness than other ranges viewed by said light amplifier.

4. An electro-optical device comprising: a pulsing source of illumination; a gated optical receiving means providing an image as an output; control means for systematically causing said receiving means to be gated "on" for a discrete time period T after the emission of each pulse by said source, said control means varying said time such that a plurality of range increments are viewed by said light amplifier within the integration time of a recording device; and means for causing a preselected varying number of illuminator pulses to impinge each said range increment whereby all ranges within the scene viewed by said light amplifier appear to have the same brightness.

5. An electro-optical device comprising: a pulsing source of illumination; a gated optical receiving means providing an image as an output; control means for sytematically causing said receiving means to be gated on for a discrete time period T after the emission of each pulse by said source, said control means varying said time such that a plurality of range increments are viewed by said light amplifier within the integration time of a recording device; and means for causing a preselected number of illuminator pulses to impinge each said range increment whereby preselected ranges within the scene viewed by said light amplifier have greater brightness than other ranges viewed by said light amplifier.

6. An electro-optical device comprising: illuminator means for illuminating a scene; timing circuitry for pulsing said illuminator means on and off; optical means comprising a gated light amplifier, said gated light amplifier being gated on for a discrete time period after each pulse of said illuminator means in a systematic manner such that a plurality of range increments are viewed by said light amplifier within a single integration period of a recording device; and means for generating a light amplifier gating pulse, said means comprising a first up counter; a second up counter; a comparator connected to provide a light amplifier gating pulse when the output of said first and said second up counters are equal; and means for loading a number into said first up counter representative of the distance to the nearest range to be viewed, said second up counter being connected to count up from zero when said illuminator means is pulsed on.

7. An electro-optical device as set forth in claim 6 wherein said light amplifier gating pulse is connected to reset said second up counter whereby said means for generating a light amplifier gating pulse will produce an output each time said illuminator means is pulsed.

8. An electro-optical device as set forth in claim 7 to further comprise a means for causing said first up counter to count up whereby said plurality of ranges are viewed by said light amplifier within a single integration time of a recording device.

* * * * *